United States Patent [19]
Rodier

[11] 3,976,929
[45] Aug. 24, 1976

[54] DEVICE FOR THE EXACT POSITIONING OF A MOVABLE PART

[75] Inventor: Rene Jean Rodier, Bobigny, France

[73] Assignee: Compagnie Honeywell Bull (Societe Anonyme), Paris Cedex, France

[22] Filed: July 16, 1974

[21] Appl. No.: 489,028

Related U.S. Application Data

[63] Continuation-in-part of Ser. No. 345,814, March 28, 1973.

[52] U.S. Cl. .............................. 318/594; 318/603
[51] Int. Cl.² ...................................... G05B 11/18
[58] Field of Search .................. 318/561, 601, 611

[56] References Cited
UNITED STATES PATENTS

| | | | |
|---|---|---|---|
| 2,947,929 | 11/1960 | Bower | 318/594 |
| 3,117,263 | 1/1964 | MacDonald | 318/594 |
| 3,458,785 | 7/1969 | Sordello | 318/594 |
| 3,473,098 | 10/1969 | Waller | 318/603 |
| 3,473,100 | 10/1969 | Anger | 318/594 |
| 3,729,668 | 4/1973 | Brette | 318/561 |
| 3,737,883 | 6/1973 | Sordello et al. | 318/576 |

OTHER PUBLICATIONS

Padalino et al., "Track–Following Servosystem," IBM Tech. Discl. Bulletin, vol. 11, No. 10, 3/69.
Arthur et al., "Linear Position Sensing System," IBM Tech. Discl. Bulletin, vol. 12, No. 1, 6/69.

*Primary Examiner*—Robert K. Schaefer
*Assistant Examiner*—John J. Feldhaus
*Attorney, Agent, or Firm*—Milton M. Field

[57] ABSTRACT

A device for the precise positioning of a movable member includes means for generating signals permitting localization of successive stop positions of the moving member and means for generating a pulse whenever the member approaches any stop position within a distance that equals a given fraction of the distance between two successive positions; when the member approaches a prescribed stop position, the relevant pulse ensures the enablement of a circuit that controls the precise stopping of the member. The device is particularly useful for setting a magnetic head on a given track of a magnetic disc.

7 Claims, 4 Drawing Figures

DEVICE FOR THE EXACT POSITIONING OF A MOVABLE PART

This application is a continuation-in-part of application Ser. No. 345,814, filed Mar. 28, 1973.

BACKGROUND OF THE INVENTION

The present invention is directed to an improvement in a device for the exact positioning of a movable part. It is particularly applicable to the exact positioning of a read and write head on a given track of a magnetic disc on which data is recorded.

Devices exist which serve to provide the displacement of movable parts according to a given rule of motion to bring them into a determined position of their trajectory. Such a device has been described in U.S. Pat. No. 3,729,668, granted Apr. 24, 1973. It particularly includes energizing media for the motor whose task is the displacement of the movable part. These media are controlled by a signal indicative of the difference between the real speed of the part, and the reference speed defined by the chosen rule of movement. This reference speed is given a constant low value as soon as the remaining distance for the part to travel becomes less than a given value, that is, when the part is close to its destination. By avoiding an abrupt deceleration of the part at the end of its course therefore the device permits a much greater rapid stabilization at the stopping point by serving to exactly position said part. In a copending United States application entitled "Precisely Positioning a Movable Member", application Ser. No. 215,967, filed Dec. 30, 1971, and assigned to the assignee of the present invention, the means are described by which several signals of sinusoidal voltage are generated, whose zero passages represent the passages of a write and read head on the different tracks of a disc. Logical pulses, generated by the zero passages of these signals, are sent to a difference of address register indicating the difference between the track to be reached and the track arrived at by the served head. This register then makes it possible to send a signal to the servo circuit for exact positioning, when the head is on the recording track to be attained. Thus, when the previously selected track is reached, the servo circuit for exact positioning compares a signal representing the real speed of the head with a reference signal originating from a multiplexer. The error signal at the output of the servo circuit permits modification of the energizing of the motor, which displaces the head until its stoppage on the desired track. Though such a device for the exact positioning of a movable part reduces to a substantial extent the number of oscillations of the head in question, about its position of equilibrium, the time required for its stabilization is considerable.

SUMMARY OF THE INVENTION

It is the object of the present invention to reduce the exact positioning time of a movable part by rendering the stabilization of that part into the desired position negligible.

According to the invention the improvement of a device for exact positioning of a movable part comprises means for generating signals of sinusoidal voltage whose zero passages represent the different reference positions of the part in motion, a difference of address register indicating the difference between the stopping position to be reached and the reference position actually attained and control means for a servo circuit which receives these sinusoidal signals and which is enabled by means of a decodification circuit when the register signals a zero difference.

The servo circuit corrects the movement of the part until its stoppage in the arrival position. It is characterized in that the difference of address register is controlled by a logical pulse generator which receives, on the one hand, the said sinusoidal signals and, on the other hand, a threshold voltage, for generating pulses whose span is a function of a given fraction of the distance between the position to be reached and the preceding reference position, and it is characterized, furthermore, in that the output of the servo circuit is linked with a control circuit for the displacement of the part, validated by the decodification circuit of the difference of address register.

Other characteristics and advantages of the present invention will evolve in the following description, offered for non-limiting, exemplary, purposes with reference to the attached drawing, in which:

DETAILED DESCRIPTION OF THE PREFERRED EMBODIMENT

Figure 1:
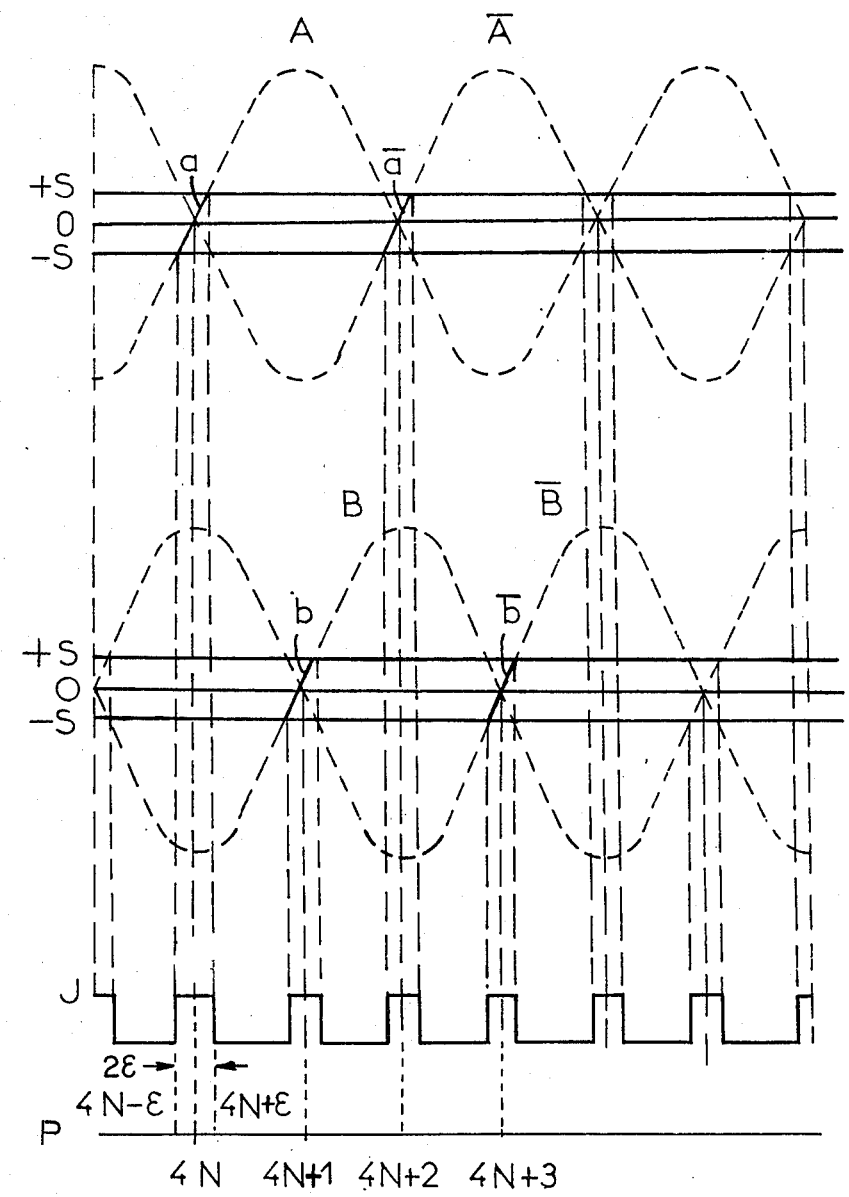
FIG. 1 represents electric signals of the device, according to the invention, connected with certain reference positions of the movable part.

In the aforementioned application Ser. No. 215,967, means were described for generating the signals A, $\overline{A}$, B, $\overline{B}$, of FIG. 1; and the disclosure of that application is hereby incorporated herein by reference. By marking in P the respective positions 4N, 4N + 1, 4N + 2, 4N + 3 of the movable part, N being an integer and 0, 1, 2, and 3 the cyclic rank of each position, the zero passage of signal A corresponds with the position 4N, that of signal B with the position 4N + 1, that of Signal $\overline{A}$ with the position of 4N + 2 and that of signal $\overline{B}$ with the position 4N + 3. The comparison of the signals A, $\overline{A}$, B, $\overline{B}$, with the threshold voltages +S and −S permits the generation of the logic pulses J corresponding with the roughly linear sections $a$, $\overline{a}$, $b$, $\overline{b}$, of the signals A, $\overline{A}$, B, $\overline{B}$, encompassing, for placing, for instance 4N with an interval (4N −ϵ, 4N +ϵ) traversed by the part.

Figure 2:
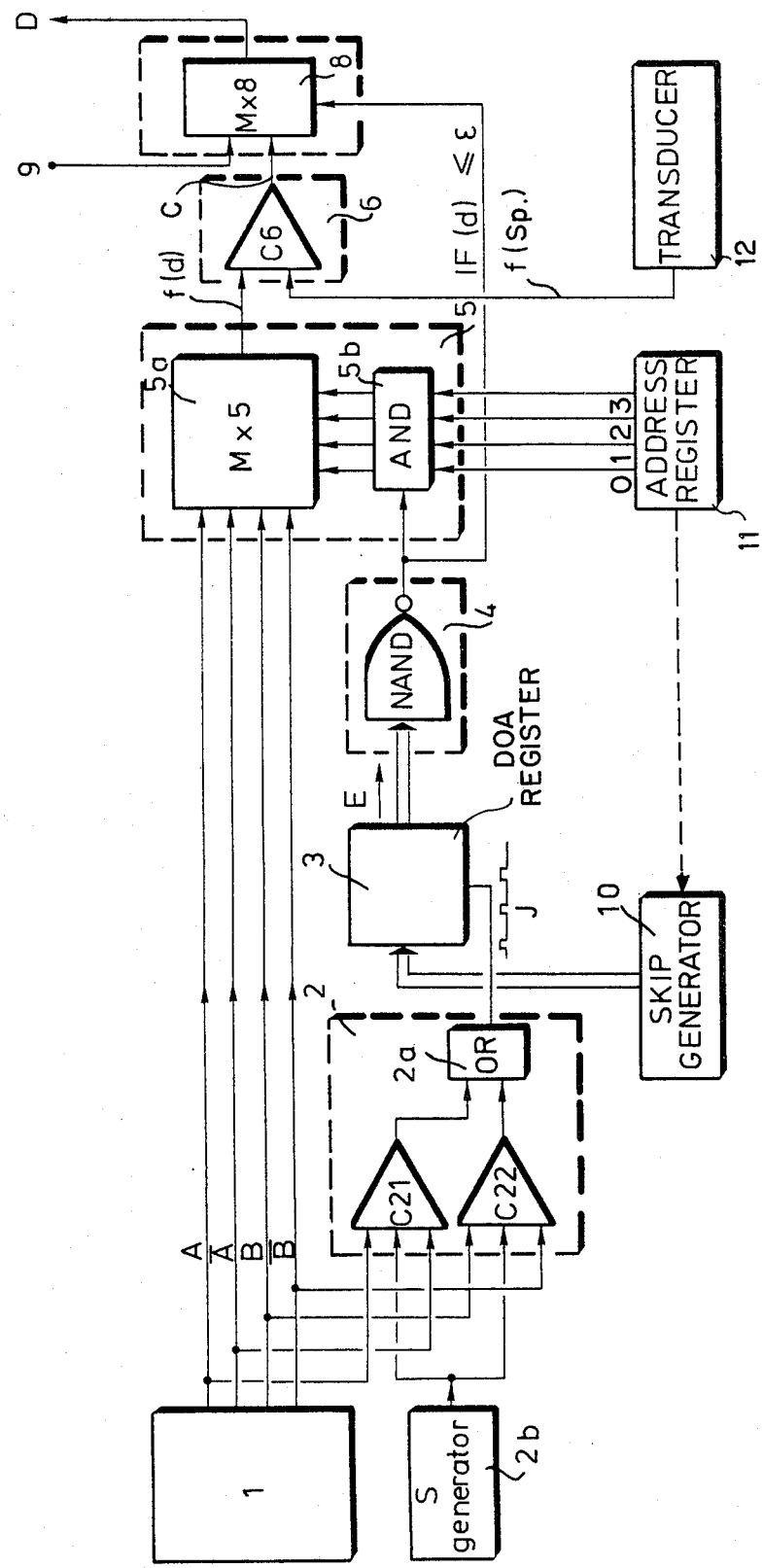
FIG. 2 is a schematic circuit diagram of the device, according to the invention.

Thus the generator 1 of the signals A, $\overline{A}$, B, $\overline{B}$, of FIG. 2, is linked with the generator 2 of logic pulses J, in the same manner as a source 2b of threshold voltage S.

Generator 2 includes a pair of double comparators $C_{11}$ and $C_{22}$ e.g., $a\mu A$ 711 including cabled OR gates. Comparator $C_{11}$ receives inputs A and $\overline{A}$ and an input from the generator 2b of threshold voltages +S and −S, and comparator $C_{22}$ receives inputs B and $\overline{B}$ and an input from generator 2b of threshold voltages +S and −S. Comparators $C_{11}$ and $C_{22}$ determine when the value of a signal A, $\overline{A}$, B, or $\overline{B}$ is equal to, or falls between the values of, threshold voltages +S and −S and, when this determination is made, provide a signal to OR gate 2a. This triggers OR gate 2a and causes it to act as a pulsing circuit providing the logic pulses J. Each pulse J sent to the difference of address register 3 enables this register to compute the difference between the position to be reached, and the arrival position, for instance 4N, from the moment in which the part arrives at the position 4N −ϵ which precedes the instant of the first passage to the position 4N. Difference of address generator 3 is, for example, formed by a binary counter used to decount (by step decrementation in response to logic impulse J from the binary coded skip provided by skip generator 10 for indicating the number of steps to be made by the movable part) until binary value zero, corresponding to the passage of the movable part to the stopping position to be reached. At the outputs of difference of address register 3, successively encoded signals E are provided, each representing the differences between the positions reached by the part and the position to be reached. When the difference is equal to zero, a decodification circuit 4, which receives the output signals E from difference of address register 3 and which comprises a NAND gate, generates a logic signal representing the arrival of the part to the stopping position to be reached from the moment at which the part arrives at a position, preceding by a distance ϵ, the exact position to be reached.

This signal generated by circuit 4 is applied to a circuit 5 for the control of a servo circuit and enables, through four AND gates represented as a group at 5b, a M×5 multiplexer 5a. An address register 11 provides a signal on one of four outputs leading to the AND gates 5b corresponding to the cyclic rank 0, 1, 2, and 3 of the position to be reached by the part. Multiplexer 5a also receives the four input signals A, $\overline{A}$, B, and $\overline{B}$.

Figure 3:
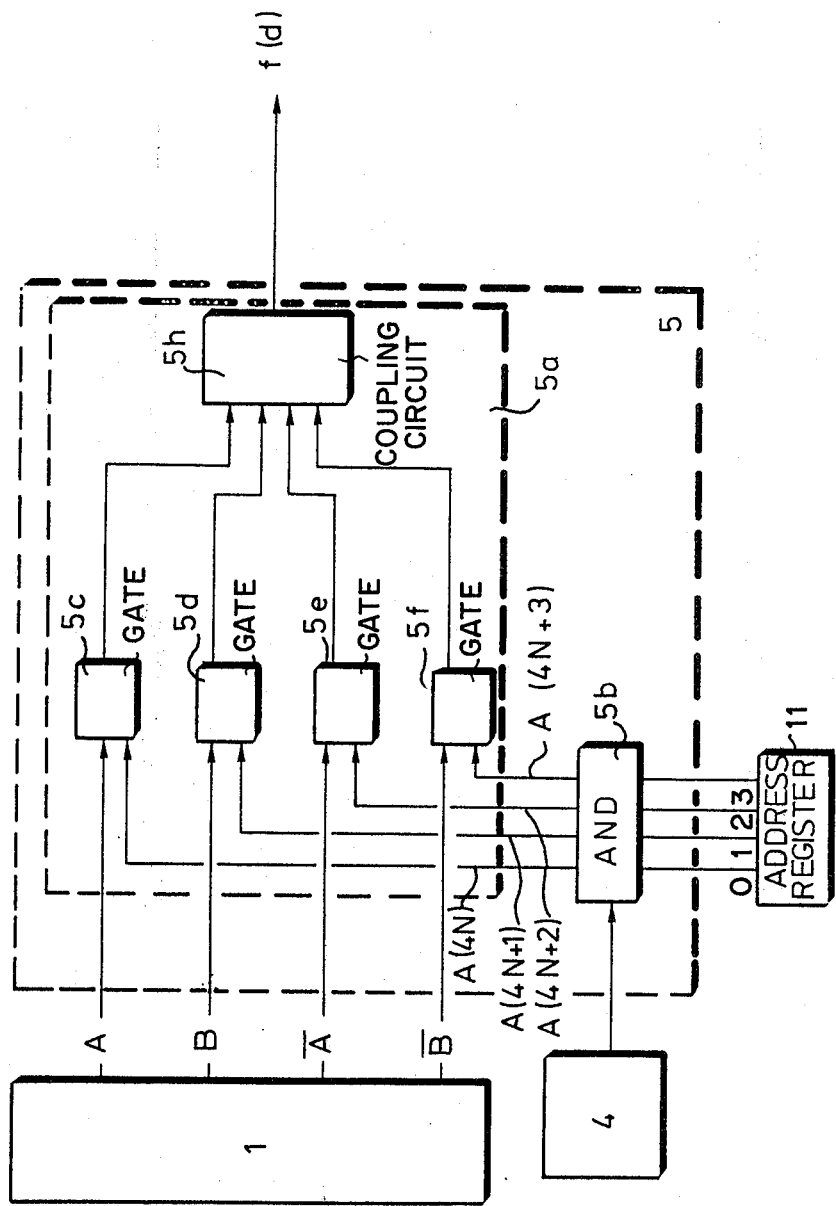
FIG. 3 is a schematic circuit diagram showing details of a portion of the device of FIG. 2.

Turning to FIG. 3, it will be seen that multiplexer 5a includes four gates, 5c, 5d, 5e, and 5f, and a coupling circuit 5h, the four inputs of which are connected respectively to outputs of the gates. By a first input, gates 5c, 5d, 5e, and 5f are connected to generator 1 to receive signals A, B, $\overline{A}$, $\overline{B}$, respectively. The zero passages of signals A, B, $\overline{A}$, $\overline{B}$ correspond respectively in FIG. 1 with successive positions 4N, 4N + 1, 4N + 2, 4N + 3 of the movable part. The four outputs of the address register 11 are respectively connected through AND gates 5b to a second input of said gates 5c, 5d, 5e, and 5f. Thus, when decodification circuit 4 enables AND gates 5b upon arrival of the part into the proximity of the position to be reached, a respective one of the four signals A, B, $\overline{A}$, $\overline{B}$ is selected by the appropriate gate 5c, 5d, 5e, or 5f and gives at the output of coupling circuit 5h a signal f(d) which is a roughly linear function of the distance d between the part and the position to be reached. Thus, the passage of the position to be reached, the address of which is given, is indicated at the output of multiplexer 5a by one of the four signals A, $\overline{A}$, B, and $\overline{B}$ as a function of the distance f(d).

One input of comparator C6 incorporated in a circuit 6 receives signal f(d), while the other input thereof is connected to a transducer 12 which supplies a signal f(Sp.) which is a function of the actual speed of the part. Circuit 6 thus generates a position correction signal C which depends on the actual speed of the part expressed by f(Sp.) for the position reached expressed by f(d). According to the actual speed, signal C has a value along distance ϵ are response to which the speed and displacement of the part D is controlled by means of a circuit 8 for smoothly slowing said part until it is precisely stopped at the prescribed position.

Circuit 8 controls the displacement of movable part D (see FIG. 4) and comprises a multiplexer M×8 having one input 9 connected to receive a signal from the servo circuit for coarse positioning of part D when it is at a distance with relation to the position to be reached $|d| > \epsilon$. At its other input, multiplexer 8 is connected to circuit 6 for controlling the exact positioning of the part when it is at a distance with relation to the position to be reached $|d| \leq \epsilon$. As indicated above, the fine control positioning of the part by means of circuit 6 is enabled by circuit 4 validating signal C applied to circuit 8.

Figure 4:
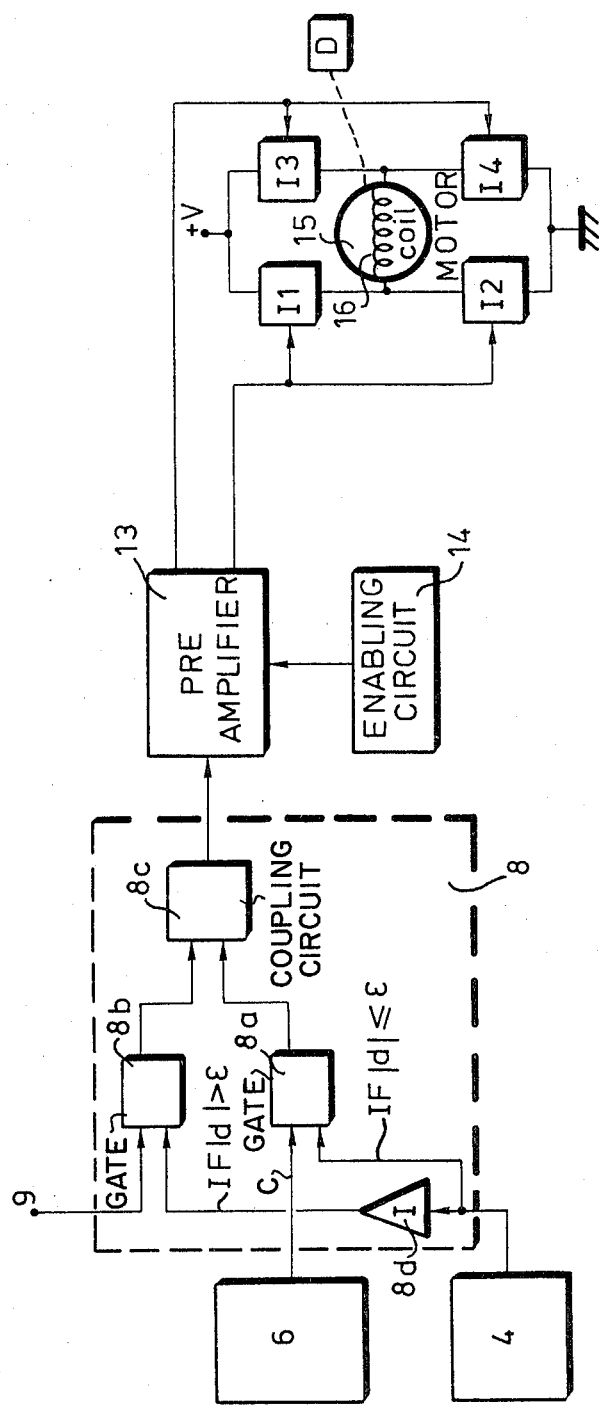
FIG. 4 is a schematic circuit diagram showing details of a portion of the device of FIG. 2 and showing the manner in which the device is connected to the motor for moving the part.

Turning to FIG. 4, it will be seen that multiplexer M×8 of circuit 8 includes two gates 8b and 8a and an OR gate 8c the two inputs of which are connected respectively to outputs of these gates. By a first coarse input, control gate 8b is connected to input 9, and a first fine control input to gate 8a is connected to circuit 6. A signal generated by circuit 6 is selected by a second input of gate 8a, this second input receiving a signal from circuit 4 when $|d| \leq \epsilon$, d being the distance between the movable part and the position to be reached. A signal coming from input 9 is selected by the other gate 8b receiving by a second input a signal from an inverter 8d connected to circuit 4 when $|d| > \epsilon$. Either one of the signals selected in circuit 8 is sent by the output of coupling circuit 8c to a preamplifier 13 two outputs of which are connected respectively through a bridge arrangement of switches 11, 12, 13, and 14 to either end of the winding 16 of motor 15. It will be readily apparent that these switches will therefore control the direction of current from voltage source V through motor coil 16. As seen in FIG. 4, motor 15 is mechanically coupled to drive the movable part D. Preamplifier 13 is enabled by an enabling circuit 14 to provide ancillary control of the positioning motor.

The servo thus designed for the exact positioning of the part to the stopping position to be reached makes use of the circuits 2, 3, 4, and 8, well known to the expert. It is easy to comprehend that the device, which is the subject of the invention, makes possible the stability of the part in its stop position more rapidly by generating control signals before it reaches that position. The fraction is best selected as a function of the constant speed at which the part runs in the vicinity of its stop position, before the beginning of the exact positioning action.

The device, such as has been described especially permits the placement of a head on a given track of a magnetic disc, by starting to service it from the moment in which it is at a distance from this track equal to the fraction 4/100 of the distance between two sequential tracks. The thus obtained service time constitutes at the most 30% of the time which would be required if the stopping of the head were only controlled from its first passage on the track.

The present invention has especial application to exact and rapid positioning of the recording indexes.

What is claimed is:
1. An improvement in a device for the exact positioning of a movable part, comprising:
   means for the generation of sinusoidal voltage signals whose zero passages represent different successive equispaced stop positions of the movable part;
   servo circuit means for correcting movement of the part until its stop at a destination stop position;
   control means for controlling application of said sinusoidal voltage signals to said servo circuit means;

pulse generator means receiving, on the one hand, said sinusoidal signals and, on the other hand, a threshold voltage whose value is a function of a given fraction of the distance between the destination stop position of the part and the previous stop position and generating a pulse whenever said sinusoidal voltage signals become equal to or smaller than said threshold voltage;

difference of address register means for storing the number of said stop positions between the destination stop position and the stop position actually attained, said difference of address register being responsive to said pulses to count down said number;

a circuit for control of the displacement of the part, said circuit receiving the output from said servo circuit means; and decodification circuit means for enabling said control means and said circuit for control of the displacement of the part when said difference of address register means signals zero as the number of stop positions between the destination stop position and the stop position actually attained.

2. An improvement of a device for exact positioning of a movable part according to claim 1, characterized by the given fraction being equal to 4/100.

3. A device for the exact positioning of a movable part to be stopped at any prescribed one of a plurality of successive, substantially equispaced stop positions, comprising: means for providing sinusoidal signals representing the position of said movable part as it moves along a path through said stop stations, the zero passages of said sinusoidal signals representing the locations of said successive stop stations; means for comparing said sinusoidal signals with a threshold signal corresponding to a predetermined fraction of the distance between two successive stop positions and for generating a logical pulse whenever said sinusoidal signals become equal to or smaller than said threshold signal; means for storing the number of zero passages between the initial position of said part and the final stop position to be reached thereby and for counting down said number in response to said pulses; and means for generating an enable signal as soon as said number counted down becomes equal to zero when said part approaches said prescribed stop position with a distance equal to or smaller than said fraction, said enable signal selectively activating fine control means operative for slowing down and dampening the movement of said part along said predetermined distance fraction, so that said part reaches said prescribed stop position and is stopped thereat within the minimum time-duration.

4. A device according to claim 3, wherein said threshold signal corresponds to a fraction of the distance between two successive stop positions amounting to substantially 4% thereof.

5. A device according to claim 3, in which at least three of said sinusoidal periodical signals are provided and wherein special addressing means are provided for selective reading of one of said signals according to the cyclic rank of the next stop position to be reached by said movable part.

6. A device according to claim 3, wherein said enable signal enables transmission to said fine control circuit means of a fraction of said space-dependent signal corresponding to the span of said logical pulse.

7. A device according to claim 3, further comprising coarse control means for controlling movement of said movable part, and gating means responsive to said enable signal for inhibiting said coarse control means when said fine control means is activated by said enable signal.

* * * * *

UNITED STATES PATENT OFFICE
CERTIFICATE OF CORRECTION

Patent No. 3,976,929          Dated August 24, 1976

Inventor(s) Rene Jean Rodier

It is certified that error appears in the above-identified patent and that said Letters Patent are hereby corrected as shown below:

Column 2, line 52, delete "for placing,".

Column 3, line 63, change "along distance $\varepsilon$ are" to -- in -- .

Column 3, line 64, change "is" to -- along distance $\varepsilon$ -- .

Column 4, line 12, change "an" to -- a coupling circuit -- .

Column 4, line 13, delete "OR gate" .

Column 4, line 14, after "coarse" insert -- control -- .

Column 4, line 15, cancel "control".

Signed and Sealed this

Seventh Day of June 1977

[SEAL]

Attest:

RUTH C. MASON
*Attesting Officer*

C. MARSHALL DANN
*Commissioner of Patents and Trademarks*